Oct. 22, 1968          G. C. WELCH          3,406,458
                        SINE BAR GAGE
Filed Aug. 9, 1967                    2 Sheets-Sheet 1

INVENTOR.
GERALD. C. WELCH.
BY
*T. P. Kemper*
ATTORNEY

Oct. 22, 1968  G. C. WELCH  3,406,458
SINE BAR GAGE

Filed Aug. 9, 1967  2 Sheets-Sheet 2

INVENTOR.
GERALD C WELCH

BY

*F. P. Kerper*
ATTORNEY

United States Patent Office 3,406,458
Patented Oct. 22, 1968

3,406,458
SINE BAR GAGE
Gerald C. Welch, 44 Titus Court, Apt. E, Titus Villa,
Rochester, N.Y. 14617
Filed Aug. 9, 1967, Ser. No. 659,407
1 Claim. (Cl. 33—174)

ABSTRACT OF THE DISCLOSURE

Angle measuring gage having heavy channel body member, a gage bar mounted on a cylindrical drum pivoted between the flanges of the channel member, and a slide block in the channel movable longitudinally by a screw and knob at one end, the block having tangential contact with the drum, and being grooved to receive opposed hairpin like piano wires secured on opposite sides of the drum, and extending oppositely in the grooves of the block to connect rectilinear movement of the block to angular movement of the drum and gage bar, and a dial gage directly indicating movement of the block.

---

This invention relates to sine bar gaging, and more particularly to such a gage that is direct reading.

It has been the practice in the accurate measurement of angles to provide a bar having spaced cylindrical measuring rolls, one of which rests upon a plate while the other is elevated from the plate by a selected series of gage blocks. The height of the gage blocks divided by the spacing between the rolls represents the natural sine of the angle between the bar and plate surface and may be converted to an angle, by reference to trigonometric tables.

The present invention is directed to a sine bar having provision for direct reading upon an ordinary micrometer gage. The invention is further directed to a sine bar that is moved to any angle by a simple manual adjustment, and in which the movement is translated to act directly on a dial indicator to measure actual angles.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

In the drawings, wherein like reference characters indicate like parts:

Figure 1:
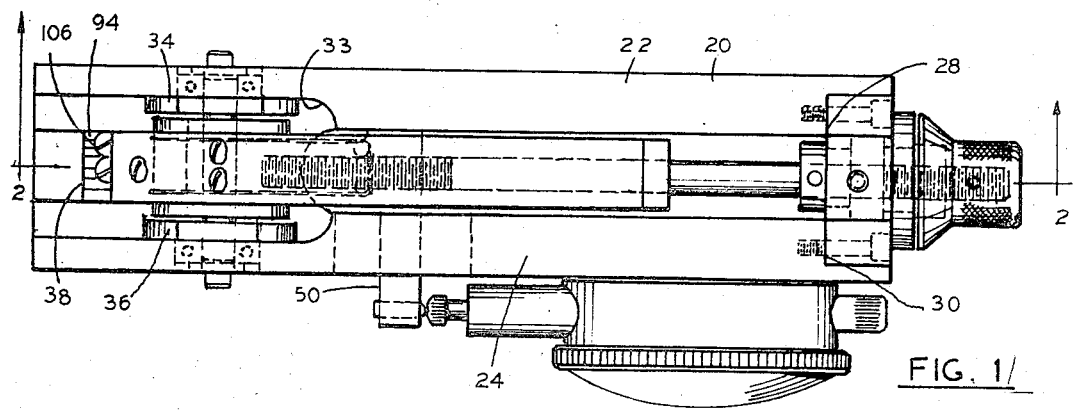
FIGURE 1 is a plan view of the direct reading sine bar gage shown set for a 45 degree angle.
Figure 2:
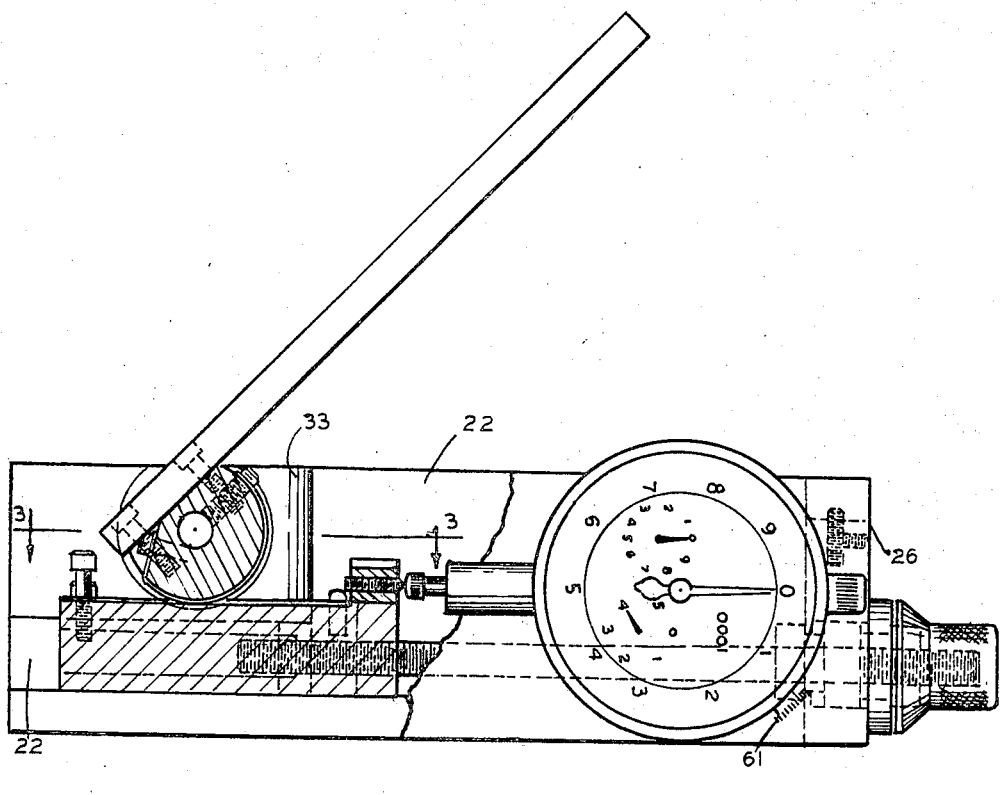
FIGURE 2 is a side view of the gage with a portion cut away on the section line 2—2 of FIGURE 1.

Referring to FIGURES 1-4, there is shown a heavy channel shaped body member 20 having side walls 22 and 24, which extend the full length of the channel. One end of the channel member is provided with a block 26 set in recesses 28 and 30, and secured in place by screws 32. The other end of the channel member has its upper portion widened out as at 33 to receive annular bearing blocks 34 and 36, and its lower portion narrowed to receive a slide block 38. The blocks 34 and 36 are secured to the side walls, as by screws 35. The bottom 40 and side walls 42 and 44 of the narrowed portion are finished surfaces, the walls 42 and 44 being parallel planes, and the bottom 40 being planar and parallel with the under finished planar surface 46 of the body member.

The slide block 38 has an accurate close slide fit on the surfaces 40 and between the walls 42 and 44. The block 38 is provided with a lateral arm 50 projecting freely through a slot 52 in the side wall 24. The arm is affixed to the block 38 by a screw 51 and pins 53 and is provided with an adjustable screw contact 54, the point of which engages and bears against the plunger 56 of a dial indicator 58, rigidly affixed to the side wall 24. The dial 59 of the dial indicator is rotatable, and may be locked in any angular position by the screw 61.

The block 38 has a hollow bore 60 extending lengthwise thereof which is threaded as at 62 to receive the threaded end 64 which projects through a thrust bearing 68 disposed in the end block 26, and the end of the rod is provided with a knob 70, which if desired may have a conical flange with optional indicia 72 for the purpose of facilitating the noting of the degree of any adjustment made, it being understood that rotation of the knob moves the slide block 38 in its channel, and the gage plunger 56. The thrust bearing 68 is preloaded between the annular member 67 affixed to the end block 26, and which bears against the outer race, and the collar 69 which bears against the inner race. Back-lash between the threaded end of the rod and the block 38 is eliminated by the split end 63, and clamp screw 65.

Figure 3:
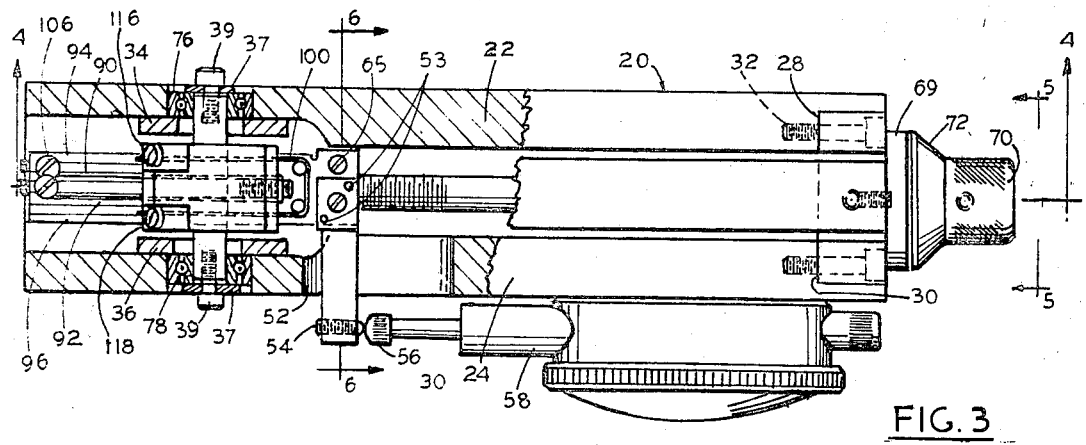
FIGURE 3 is a plan view of the gage set for zero angle, with a portion cut away on the line 3—3 of FIGURE 2.
Figure 5:
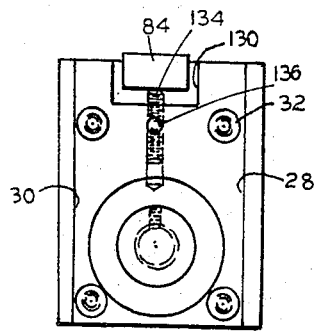
FIGURE 5 is a front end view.
Figure 6:
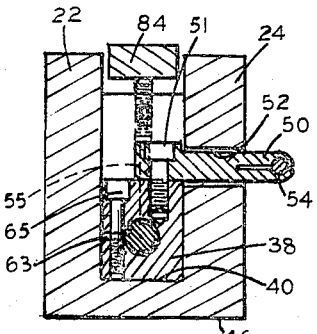
FIGURE 6 is a sectional view taken on the line 6—6 of FIGURE 3.
Figure 7:
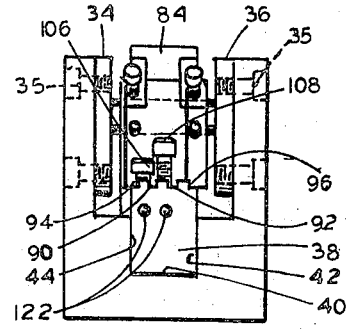
FIGURE 7 is a rear end view.
Figure 4:
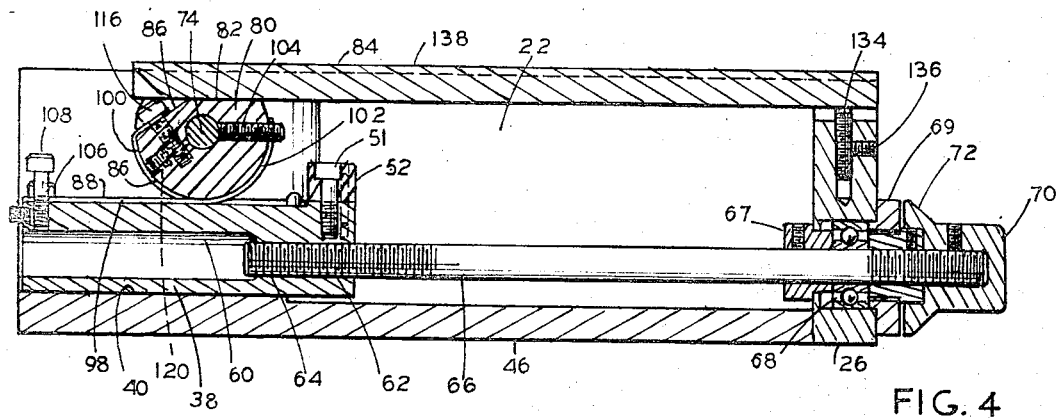
FIGURE 4 is a longitudinal section taken on the line 4—4 of FIGURE 3.

Pivoted in antifriction bearings 76 and 78 is a cross shaft 74. The antifriction bearings are disposed between the annular block 34 and 36 which are secured to the side walls 22 and 24, as by screws 35. The bearings are preloaded by pressure applied to washers 37 by screws 39, the washers bearing against the inner races, while the outer races of the bearings 76 and 78 bear against the blocks 34 and 36 respectively, as indicated in FIGURES 3 and 7.

Affixed to the shaft 74 is a cylindrical member 80 having a flat side 82 to which an angle indicating arm 84 or sine bar is secured. The cylindrical surface 86 of the member 80 is concentric with the axis of the shaft 74, and tangential with the upper surface 88 of the slide block 38, such surface 88 being parallel with the bottom wall 40 of the channel in which the block 38 slides. On the upper surface of the block 38 are parallel grooves 90 and 92, and corner grooves 94 and 96, which are of a depth sufficient to receive two hairpin like sections of piano wire 98 and 100, one section 98 being narrower and having its ends lying in the grooves 90 and 92, and the other 100, being wider and having its ends lying in corner grooves 94 and 96. The loop end 102 of wire 98 is wrapped part way around the cylindrical drum surface 98, and the loop is hung around an annular groove in the head end of the threaded Allen head setscrew 104, which bears against the shaft 74. The free ends of the wire 98 may be wrapped around and secured to set screws 106 and 108, which are in turn locked by set screws 106 and 108, which are in turn locked by set screws 122. The wires 98 and 100 are placed under tension to eliminate back lash.

The wire 100 has its loop hung around spaced pins 112 which are tangential to the grooves 94 and 96. The ends of the loop wrap around the drum cylindrical surface 86 and are secured to and may be wound up on screws 114 and 116 threaded into flats 118 milled into the drum. The screws 114 and 116 are locked by recessed set screws 120 of the Allen head type.

The front end block is provided with a recess 130 to receive the arm 84, and a screw 134, locked by a set screw 136 acts as a stop and may be adjusted to so act when the top surface 138 of the bar 84 is parallel with the under surface 46.

It will be seen that the rotation of the drum 80 is accurately translated to the movement of the slide block 38 without back lash in either direction, by proper tensioning of the wire loops 98 and 100. Thus the dial 59 of gage 58 may indicate 10 thousandths of an inch for each revolution, and the smaller dial 150 may indicate revolutions of the indicator hand H while the dial 152 indicates revolutions of the hand on dial 150. Hence the movement of the block 38 is accurately measured over a range of 0.500 inch. With the drum 80 having a radius of a half inch, movement of the block 38, 0.00872 represents a degree, one sixtieth thereof or 0.0001454 represents a minute. In this manner the dial readings are converted to actual angle measurements, and if desirable the dial indicator can be calibrated in degrees, whereby direct readings of angles would be rendered. Thus resort to trigonometry tables would be avoided.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

1. An angle measuring gage comprising a body member of channel shaped cross section having a bottom and facing side walls, a slide block having a rectangular cross section slidably disposed on the bottom and between parallel faces of the side walls in one end of the body member, a cylindrical member having a flat side mounted on a cross shaft journalled in the side walls of the body member, said cylindrical member having a cylindrical surface facing downwardly and disposed immediately above said slide block, and an indicating arm affixed to the flat side, two U shaped hairpin-like sections of piano wire, each having uniformly spaced leg portions extending from a loop portion, the loop portion of one section being wider than the other, and the leg portions of both sections extending between the cylindrical surface and the slide block, with the leg portions of one section disposed between the leg portions of the other section and having their loop and leg portions affixed to opposite sides of said cylindrical member and opposite ends of said slide block, means to place said wire sections under tension, screw means extending lengthwise of the channel member for moving said slide block lengthwise of the channel, a lateral arm on said slide block projecting through a slot in one side wall of the channel, and a dial indicator affixed to the side of the channel member and having a plunger disposed longitudinally with respect to the channel and engaging the lateral arm whereby to indicate the movement thereof and directly indicate the angular movement of said indicating arm.

References Cited
UNITED STATES PATENTS

| | | | |
|---|---|---|---|
| 1,428,509 | 9/1922 | Weingar | 33—174 X |
| 2,404,639 | 7/1946 | Lane | 74—89.2 X |
| 2,669,027 | 2/1954 | Wilson | 33—174 |
| 3,090,127 | 5/1963 | Goyeneche | 33—174 |

SAMUEL S. MATTHEWS, *Primary Examiner.*